(12) United States Patent
Matsumoto et al.

(10) Patent No.: US 12,056,779 B2
(45) Date of Patent: Aug. 6, 2024

(54) RECEPTION SYSTEM, RECEPTION METHOD, AND PROGRAM

(71) Applicant: NEC Platforms, Ltd., Kawasaki (JP)

(72) Inventors: Teruoki Matsumoto, Kanagawa (JP); Hiroshi Sakamoto, Kanagawa (JP); Naorni Kakinaga, Kanagawa (JP); Kiyokazu Otsuka, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 260 days.

(21) Appl. No.: 17/606,794

(22) PCT Filed: Feb. 20, 2020

(86) PCT No.: PCT/JP2020/006662
§ 371 (c)(1),
(2) Date: Oct. 27, 2021

(87) PCT Pub. No.: WO2021/131085
PCT Pub. Date: Jul. 1, 2021

(65) Prior Publication Data
US 2022/0198585 A1 Jun. 23, 2022

(30) Foreign Application Priority Data
Dec. 23, 2019 (JP) ................. 2019-231084

(51) Int. Cl.
*G06Q 10/02* (2012.01)
*G06Q 50/12* (2012.01)
*G07C 9/00* (2020.01)

(52) U.S. Cl.
CPC ............. *G06Q 50/12* (2013.01); *G06Q 10/02* (2013.01); *G07C 9/00904* (2013.01)

(58) Field of Classification Search
CPC ..... G06Q 50/12; G06Q 10/02; G07C 9/00904
See application file for complete search history.

(56) References Cited

U.S. PATENT DOCUMENTS

2016/0162811 A1* 6/2016 Bhattad ................. G06Q 10/02
705/5
2021/0407230 A1* 12/2021 Amuduri ............... H04W 12/63

FOREIGN PATENT DOCUMENTS

CN 108921985 A 11/2018
EP 2709045 A1 * 3/2014 ............ G06Q 10/02
(Continued)

OTHER PUBLICATIONS

Automation, "Automated hotel self check in desk", Nov. 23, 2019 https://web.archive.org/web/20191123230021/https://medium.com/@automationtechnologies7/automated-hotel-self-check-in-desk-4d3a97ea5faf (Year: 2019).*
(Continued)

*Primary Examiner* — Rupangini Singh (57) ABSTRACT

The present invention provides a reception system, a reception method, and a non-transitory computer-readable medium storing a program that are capable of identifying a guest. The reception system (100) includes a face photo information check unit (1), and a reception terminal (2). When the reception terminal (2) receives an input indicating an application for a check-in of a guest (GS1), the face photo information check unit (1) checks passport-face-photo-at-check-in-time information scanned from a passport (P1) at the time of check-in, with face-photo-at-check-in-time information through photographing the guest (GS1) at the time of check-in. When the passport-face-photo-at-check-in-time information and the face-photo-at-check-in-time information indicate a same person as a result of checking by the face photo information check unit (1), the reception terminal (2) displays information on a room reserved by the guest (GS1), and issues a card key for the room reserved by the guest (GS1).

6 Claims, 5 Drawing Sheets

(56) References Cited

FOREIGN PATENT DOCUMENTS

| EP | 2709045 A1 | 3/2014 |
|---|---|---|
| JP | 2008-102757 A | 5/2008 |
| JP | 2018-190307 A | 11/2018 |
| JP | 2019-046124 A | 3/2019 |
| JP | 2019-175410 A | 10/2019 |
| JP | 6614291 B1 | 12/2019 |

OTHER PUBLICATIONS

Albattat et al., "Biometric Technologies in Emergency Management: The Case of Hotels", International Journal of Tourism & Hospitality Reviews, vol. 1 (1), Nov. 2014, pp. 44-50 (Year: 2014).*
International Search Report for PCT Application No. PCT/JP2020/006662, mailed on Mar. 24, 2020.
Japanese Office Communication for JP Application No. 2019-231084 mailed on Sep. 8, 2020 with English Translation.

* cited by examiner

RECEPTION SYSTEM, RECEPTION METHOD, AND PROGRAM

This application is a National Stage Entry of PCT/JP2020/006662 filed on Feb. 20, 2020, which claims priority from Japanese Patent Application 2019-231084 filed on Dec. 23, 2019, the contents of all of which are incorporated herein by reference, in their entirety.

TECHNICAL FIELD

The present invention relates to a reception system, a reception method, and a non-transitory computer-readable medium storing a program.

BACKGROUND ART

A fee adjustment machine for an accommodation facility disclosed in Patent Literature 1 can execute a check-in process and a check-out process. The check-in process can execute a payment process, and an issuance process. The payment process can execute payment about accommodation. The issuance process can issue card keys for unlocking a guest room, up to the number of which depends on guests, after completion of the payment process. The check-out process is characterized by capability of collecting the card keys up to the maximum number of collections determined on the basis of the number of cards issued by the check-in process.

CITATION LIST

Patent Literature

[Patent Literature 1] Japanese Unexamined Patent Application Publication No. 2019-046124

SUMMARY OF INVENTION

Technical Problem

It is required that such a fee adjustment machine for an accommodation facility can verify whether a person performing the check-in process or the like is a guest themself or not.

In view of the problem described above, an object of the present disclosure is to provide a reception system, a reception method, and a program that are capable of identifying a guest at the time of check-in.

Solution to Problem

A reception system according to one example embodiment in the present disclosure includes:
 a face photo information check unit; and
 a reception terminal, wherein
 when the reception terminal receives an input indicating an application for a check-in of a guest, the face photo information check unit checks passport-face-photo-at-check-in-time information scanned from a passport at the time of check-in, with face-photo-at-check-in-time information on the guest photographed at the time of check-in, and
 when the passport-face-photo-at-check-in-time information and the face-photo-at-check-in-time information indicate a same person as a result of checking by the face photo information check unit, the reception terminal displays information on a room reserved by the guest, and issues a card key for the room reserved by the guest.

A reception method according to one example embodiment in the present disclosure includes:
 checking, upon receipt of an input indicating an application for a check-in of a guest, passport-face-photo-at-check-in-time information scanned from a passport at the time of check-in, with face-photo-at-check-in-time information on the guest photographed at the time of check-in; and
 displaying information on a room reserved by the guest, and issuing a card key for the room reserved by the guest, when the passport-face-photo-at-check-in-time information and the face-photo-at-check-in-time information indicate a same person as a result of checking.

A non-transitory computer-readable medium according to one example embodiment in the present disclosure stores a program causing
 a computer operating in a reception system to execute:
 checking, after receipt of an input indicating an application for a check-in of a guest, passport-face-photo-at-check-in-time information scanned from a passport at the time of check-in, with face-photo-at-check-in-time information on the guest photographed at the time of check-in; and
 displaying information on a room reserved by the guest, and issuing a card key for the room reserved by the guest, when the passport-face-photo-at-check-in-time information and the face-photo-at-check-in-time information indicate a same person as a result of checking.

Advantageous Effects of Invention

The present disclosure can provide a reception system, a reception method, and a non-transitory computer-readable medium storing a program that are capable of identifying a guest at the time of check-in.

DESCRIPTION OF EMBODIMENTS

Hereinafter, a specific example embodiment to which the present invention is applied is described in detail with reference to the drawings. Note that the present invention is not limited to the following example embodiments. To clarify the description, the following description and drawings are appropriately simplified.

Example Embodiments

Figure 1:
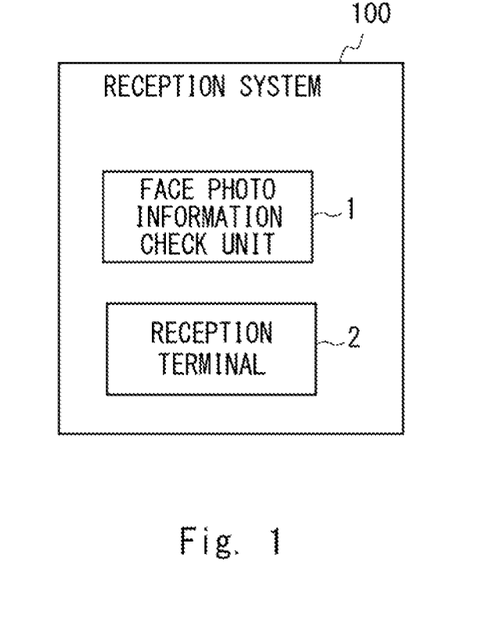
FIG. 1 is a block diagram showing a configuration of a reception system according to an example embodiment.

Hereinafter, referring to FIG. 1, example embodiments of the present invention are described. FIG. 1 is a block diagram showing a configuration of a reception system according to an example embodiment.

As shown in FIG. 1, a reception system 100 according to the example embodiment includes a face photo information check unit 1, and a reception terminal 2. The reception system 100 can be used for reception of an accommodation facility. The accommodation facility is, for example, a hotel, an inn, a private lodging facility, etc.

The face photo information check unit 1 checks multiple pieces of face photo information, and determines whether the multiple pieces of face photo information are of a same person or not. The multiple pieces of face photo information are, for example, passport-face-photo-at-check-in-time information. The passport-face-photo-at-check-in-time information is scanned from a passport at the time of check-in. When the reception terminal 2 receives an input indicating an application for a check-in of a guest, the face photo information check unit 1 checks the passport-face-photo-at-check-in-time information with face-photo-at-check-in-time information.

When the passport-face-photo-at-check-in-time information and the face-photo-at-check-in-time information indicate a same person as a result of checking by the face photo information check unit 1, the reception terminal 2 displays information on a room (also called a guest room) reserved by the guest. Furthermore, the reception terminal 2 issues a card key for the room reserved by the guest.

The configuration of the reception system 100 can determine whether the person is the guest themself or not, on the basis of a face photo image obtained by taking the person having made an input indicating an application for a check-in, and of a face photo image on the passport. Even without any receptionist in the accommodation facility, the reception system 100 can identify the guest. Based on a result by the face photo information check unit 1 checking and identifying the guest, the reception terminal 2 displays information on a room reserved by the guest, and issues a card key for the room. Consequently, the reception of the accommodation facility can be made unattended. Furthermore, the convenience of the guest can be improved.

First Example Embodiment

Figure 2:
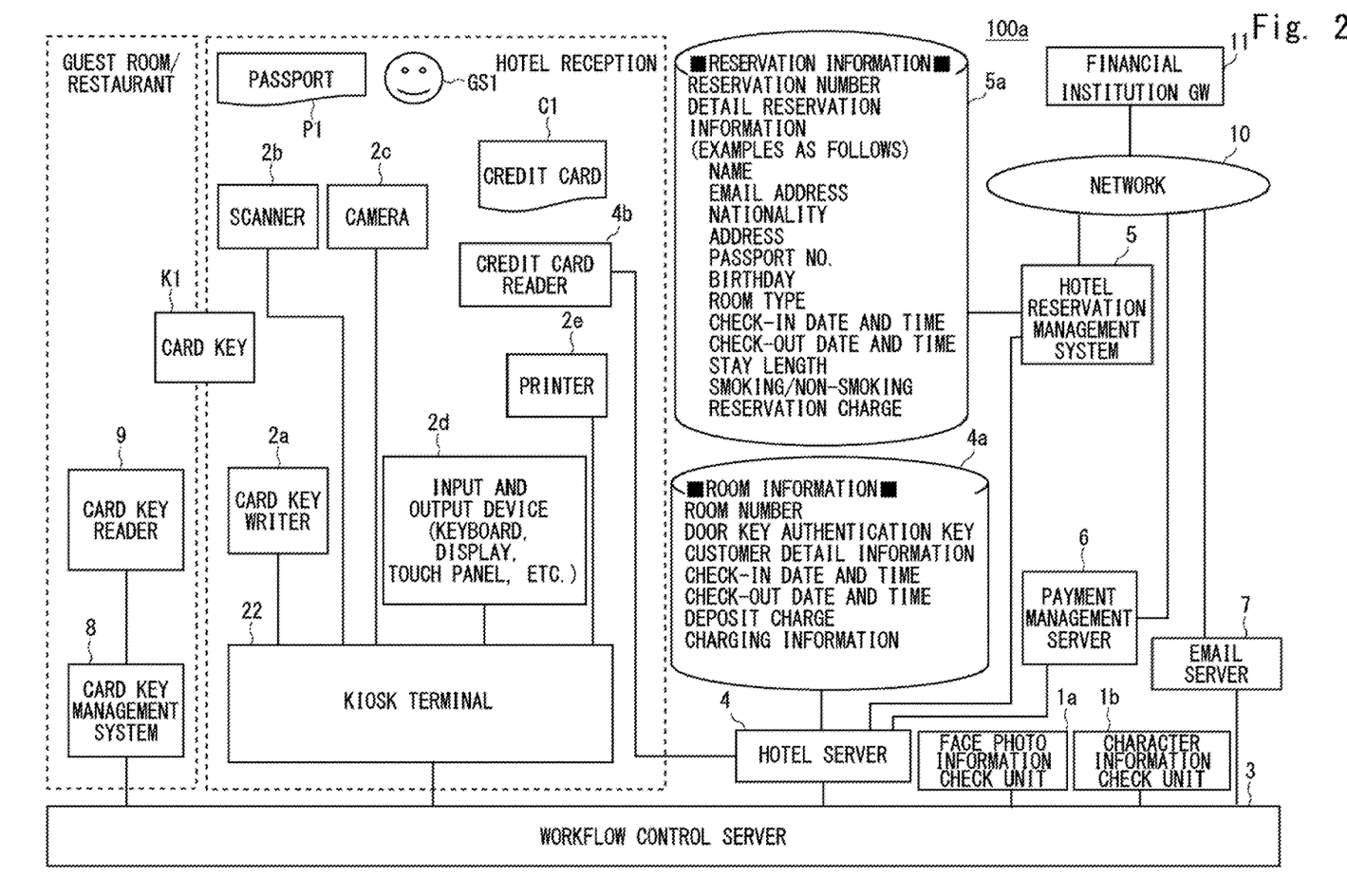
FIG. 2 is a block diagram showing one configuration example of a reception system according to a first example embodiment.

Hereinafter, referring to FIG. 2, a first example embodiment is described. FIG. 2 is a block diagram showing one configuration example of a reception system according to the first example embodiment.

As shown in FIG. 2, a reception system 100a includes a face photo information check unit 1a, a character information check unit 1b, a kiosk terminal 22, and a workflow control server 3. The reception system 100a may appropriately include at least one of a hotel server 4, a hotel reservation management system 5, a payment management server 6, an email server 7, a card key management system 8, and a card key reader 9.

The face photo information check unit 1a can check multiple pieces of face photo information that indicate face photos of a predetermined person, and verify whether the person of the face photos indicated by the multiple pieces of face photo information is identical or not. The face photo information check unit 1a may be, for example, a face authentication system. The identical check result means a case where the matching degrees of obtained face data items are compared with each other, and the matching degrees exceed a determination value J1. The determination value J1 may be changed depending on an environment for using the reception system 100a. The environment for using the reception system 100a is, for example, a hotel location, an accommodation price range, presence or absence of use of another auxiliary check, or combination thereof or the like. The face photo information check unit 1a shown in FIG. 2 is provided so as to transmit and receive various pieces of information to and from the workflow control server 3. This unit may be provided in the workflow control server 3 or the kiosk terminal 22.

The character information check unit 1b can check multiple pieces of character information with each other, and verify whether the information indicated by the multiple pieces of character information match or not. The character information check unit 1b may be, for example, a character authentication system. The character information check unit 1b shown in FIG. 2 is provided so as to transmit and receive various pieces of information to and from the workflow control server 3. This unit may be provided in the workflow control server 3 or the kiosk terminal 22.

The kiosk terminal 22 includes a card key writer 2a, a scanner 2b, a camera 2c, an input and output device 2d, and a printer 2e. The kiosk terminal 22 is a specific example of the reception terminal 2 shown in FIG. 1. The kiosk terminal 22 may be configured by adopting a personal computer, for example.

The card key writer 2a creates a card key K1 associated with a corresponding room of the hotel. The scanner 2b scans a passport P1, and generates face photo information on the passport P1. The camera 2c photographs a guest GS1 who is operating the kiosk terminal 22 or is adjacent to the kiosk terminal 22. The camera 2c generates face photo information on the guest GS1. The input and output device 2d receives an input of a check-in or a check-out from the guest GS1. The input and output device 2d may be, for example, a keyboard, a display, a touch panel, a speaker, a sound collector or the like, or a combination thereof. The printer 2e prints a receipt and the like.

The workflow control server 3 is connected by wire or wirelessly to the face photo information check unit 1a, the character information check unit 1b, the kiosk terminal 22, the hotel server 4 and the card key management system 8, and appropriately transmits and receives various pieces of information.

The hotel server 4 includes a storage device 4a. The storage device 4a stores room information. The stored room information is, for example, a room number, a card key authentication key, customer detail information, a check-in date and time, a check-out date and time, a deposit charge, and charging information.

A credit card reader 4b is provided at the hotel reception, and reads a credit card C1 of the guest GS1. The hotel server 4 obtains information on the credit card C1 from the credit card reader 4b.

The hotel reservation management system 5 includes a storage device 5a. The storage device 5a stores reservation information. The reservation information is, for example, a reservation number, and detail reservation information. The detail reservation information is, for example, the guest's name, email address, nationality, address, passport No. (passport number), birthday, room type, check-in date and time, check-out date and time, stay length, preference for a smoking room or a non-smoking room, reservation charge and the like. The guest GS1 inputs the detail reservation information via a network 10 and the hotel reservation management system 5, thus storing the detail reservation information in the storage device 5a.

The hotel reservation management system 5, the payment management server 6, and the email server 7 transmit and receive various pieces of information to and from a financial institution GW (gateway) 11 via the network 10. The financial institution receives requests for a credit check, and for payment for a deposit charge.

The card key reader 9 reads the card key K1. The card key management system 8 unlocks or locks the room of the guest (guest room) depending on the card key K1 read by the card key reader 9.

(Check-In Operation)

Figure 3:
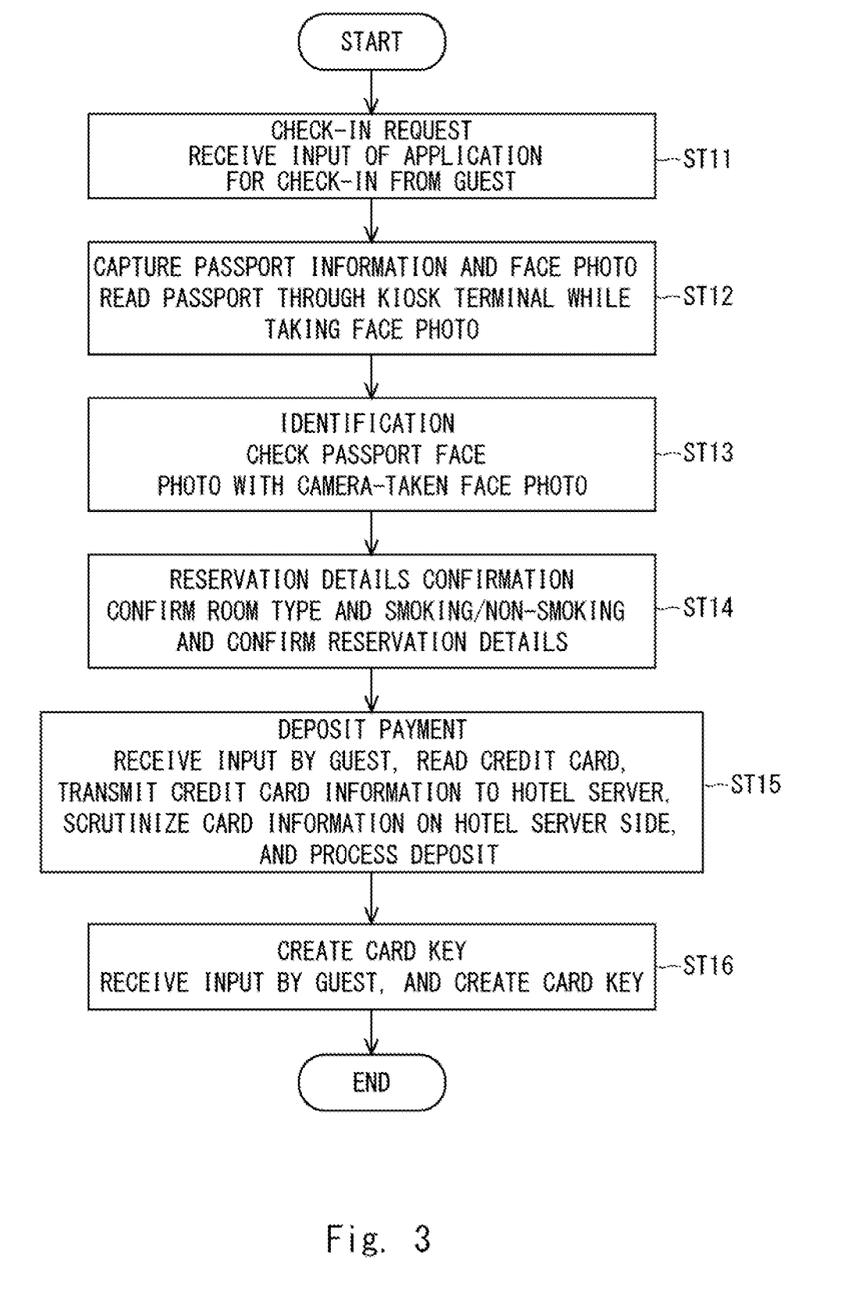
FIG. 3 is a flowchart showing one operation example of the reception system according to the first example embodiment.

Referring to FIG. 3, one operation example of the reception system according to the first example embodiment is described. FIG. 3 is a flowchart showing the one operation example of the reception system according to the first example embodiment.

The kiosk terminal 22 receives an input of an application for a check-in from the guest GS1 (check-in request step ST11). Specifically, the display or the touch panel of the input and output device 2d of the kiosk terminal 22 displays an initial selection screen. The input and output device 2d receives the input indicating the application for a check-in onto an initial selection screen by the guest GS1, and further receives an input of a reservation number or the name of the guest GS1. The reservation number or the name of the guest GS1 is made by the guest GS1 preliminarily making a reservation via the network 10 using the hotel reservation management system 5 before the check-in, and is stored in the storage device 5a.

Subsequently, while the passport P1 is scanned using the scanner 2b of the kiosk terminal 22, a face photo of the guest GS1 is taken using the camera 2c (passport information and face photo capture step ST12).

Specifically, a passport reading button is displayed on the input and output device 2d of the kiosk terminal 22. An input of the passport reading button by the guest GS1 is received. The passport P1 is scanned using the scanner 2b, and passport face photo information, and passport character information are obtained. A face photo indicated by the passport face photo information, and information indicated by the passport character information are displayed on the input and output device 2d of the kiosk terminal 22. The information indicated by the passport character information is, for example, the passport number, expiration date, name, address, birthday, etc.

A photographing execution button for a personal image is displayed on the input and output device 2d of the kiosk terminal 22, and a face photo of the guest GS1 is taken using the camera 2c. The taken face photo is displayed on the input and output device 2d of the kiosk terminal 22. Upon receipt of an input through pressing of the photographing execution button by the guest GS1, an image that the camera 2c is capturing at the time is taken, and face photo information on the guest GS1 is generated.

Subsequently, the passport face photo information is checked with the taken face photo information on the guest GS1, thus performing identification (identification step ST13).

Specifically, the kiosk terminal 22 attaches the passport face photo information and the taken face photo information, and issues a face authentication request to the workflow control server 3. The workflow control server 3 requests authentication from the face photo information check unit 1a on the basis of the requested face authentication request. The face photo information check unit 1a compares respective images indicated by the received passport face photo information and taken face photo information, and calculates and then returns the probability of being a same person. The kiosk terminal 22 receives the calculated probability via the workflow control server 3. When the calculated probability is equal to or higher than a preregistered threshold, the kiosk terminal 22 determines that the guest GS1 is successfully identified.

The passport character information, and reservation information stored in the storage device 5a may be checked with each other. The check may be executed as auxiliary measures for identification. The kiosk terminal 22 attaches the passport character information, and issues a character authentication request to the workflow control server 3. The workflow control server 3 requests authentication from the character information check unit 1b on the basis of the requested character authentication request. The character information check unit 1b compares the received passport character information with the reservation information on the guest GS1 stored in the storage device 5a, and determines and then returns whether these pieces of information indicate identical content or not. The kiosk terminal 22 receives the determined result via the workflow control server 3. When the calculated probability is equal to or higher than a preregistered threshold, the kiosk terminal 22 determines that the guest GS1 is successfully identified.

Subsequently, the room type, the presence or absence of preference for a smoking room or a non-smoking room and the like are presented depending on the identification result, and reservation details are confirmed (reservation details confirmation step ST14).

Specifically, the kiosk terminal 22 uses, as a key, the reservation number input by the guest GS1 or the name of the guest GS1. The kiosk terminal 22 uses this key, and requests the hotel reservation management system 5, via the workflow control server 3 and the hotel server 4, to read the reservation information stored in the storage device 5a. The hotel server 4 refers to the reservation information read by the hotel reservation management system 5, selects a room that conforms to the reservation information and is currently available, and returns the selection together with the reservation information. The kiosk terminal 22 displays the received information with a check-in approval button. The kiosk terminal 22 receives an input on the check-in approval button by the guest GS1, and writes, via the workflow control server 3, the room number, information on the customer and the like, in the room information stored in the storage device 4a of the hotel server 4.

Subsequently, credit card information on the credit card C1 is read using the credit card reader 4b, and a deposit is processed (deposit payment step ST15).

Specifically, the kiosk terminal 22 displays a deposit payment button, and receives an input on the deposit payment button by the guest GS1. The kiosk terminal 22 instructs the credit card reader 4b to read the credit card, via the workflow control server 3 and the hotel server 4. The credit card reader 4b reads the credit card C1, and transmits information on the credit card C1 to the hotel server 4. The hotel server 4 asks the financial institution to perform a credit check based on the information on the credit card C1 and the like, via the payment management server 6 and the financial institution GW 11. When a credit check result has no problem, the hotel server 4 records the deposit charge in the room information stored in the storage device 4a. The hotel server 4 requests the financial institution to pay the deposit charge, via the financial institution GW 11.

Lastly, the card key K1 is created (card key creation step ST16). Specifically, the kiosk terminal 22 displays a card key writing button, and receives an input on the card key writing button by the guest GS1. The check-in room number and, furthermore, an authentication key required for authentication are written in the card key K1. The kiosk terminal 22 may display, for the guest GS1, content that prompts the guest GS1 to put the card key K1 on the card key writer 2a.

As described above, the passport face photo information is checked with the face-photo-at-check-in-time information, thus verifying whether the guest GS1 having issued the application for a check-in to the kiosk terminal 22 and the person having reserved accommodation to the hotel reservation management system 5 are identical or not. Consequently, the guest GS1 can be identified at the time of check-in. Furthermore, information on the room reserved by the guest GS1, and the card key for the room are provided for the guest. Accordingly, the guest is not required to input information on the room number and the like, can obtain the information on the room and the card key for the room, reduce the wait time in comparison with a case of manual identification, and facilitate improvement in convenience of the user.

The reception system 100a according to this first example embodiment checks the passport face photo information with the face-photo-at-check-in-time information, and is not required to preregister the face photo. Accordingly, the reception system 100a can be introduced without changing the existing hotel reservation management system 5.

The reception system 100a according to this first example embodiment further includes the character information check unit 1b. When the kiosk terminal 22 receives the input indicating the application for a check-in of the guest GS1, the character information check unit 1b checks the passport character information with the reservation information on the guest GS1. In the reception system 100a according to this first example embodiment, at the time of check-in, the passport character information, and the guest reservation information include at least one of the given name and surname, nationality, address, passport number, and birth date of the bearer of the passport. Accordingly, more information can be checked. Consequently, the identification can be achieved at higher accuracy. For example, even in a case of twins or the like where the face photo information on the passport matches the taken face photo information, the identification can be achieved. Even when the input name of the guest GS1 is an identical name, the guest GS1 can be identified.

(Check-Out Operation)

Figure 4:
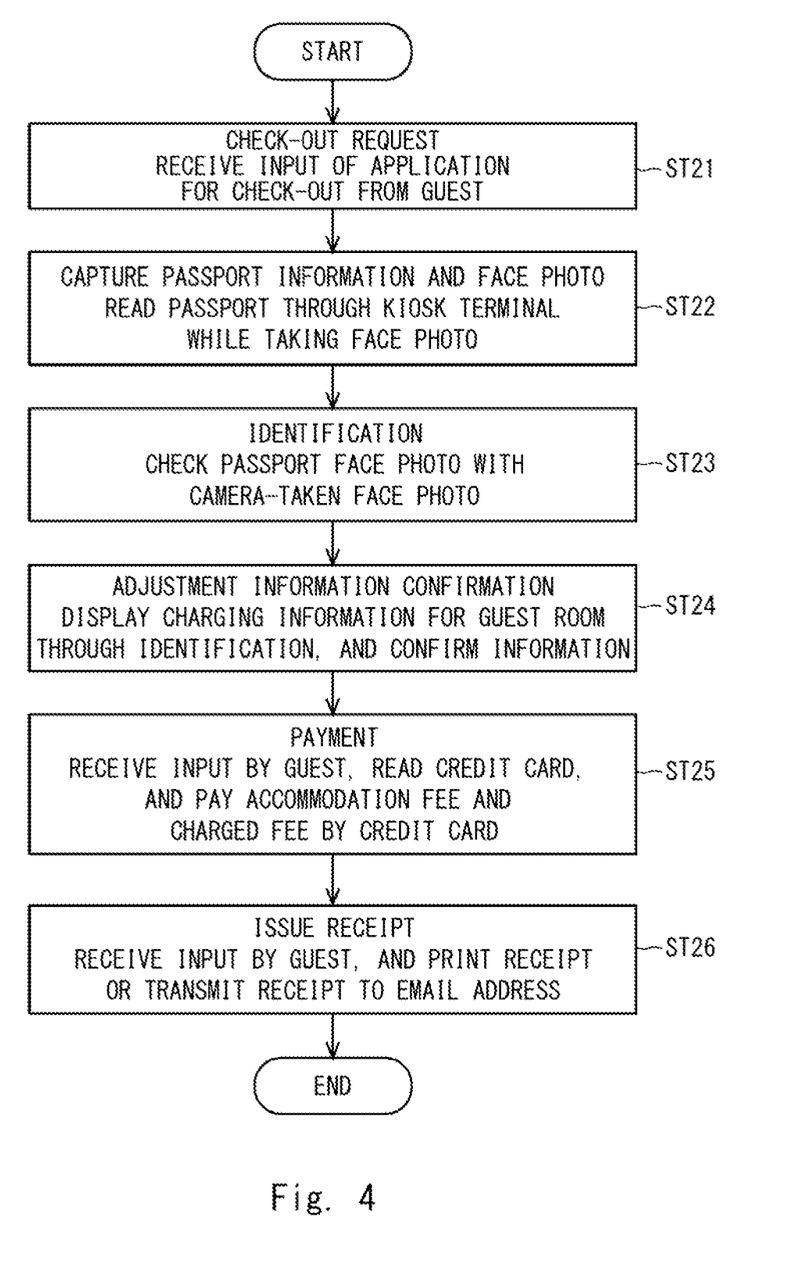
FIG. 4 is a flowchart showing another operation example of the reception system according to the first example embodiment.

Referring to FIG. 4, another operation example of the reception system according to the first example embodiment is described. FIG. 4 is a flowchart showing another operation example of the reception system according to the first example embodiment.

The kiosk terminal 22 receives an input of an application for a check-out from the guest GS1 (check-out request step ST21). Specifically, the display or the touch panel of the input and output device 2d of the kiosk terminal 22 displays an initial selection screen. The input and output device 2d receives the input indicating the application for a check-out onto an initial selection screen by the guest GS1, and further receives an input of a room number or the name of the guest GS1. The room number, or the name of the guest GS1 is stored in the storage device 4a of the hotel server 4.

Subsequently, while the passport P1 is scanned using the scanner 2b of the kiosk terminal 22, a face photo of the guest GS1 is taken using the camera 2c (passport information and face photo capture step ST22).

Specifically, similar to the passport information and face photo capture step ST12 (see FIG. 3), the passport reading button is displayed on the input and output device 2d of the kiosk terminal 22. An input of the passport reading button by the guest GS1 is received. The passport P1 is scanned using the scanner 2b, and passport face photo information, and passport character information are obtained. A face photo indicated by the passport face photo information, and information indicated by the passport character information are displayed on the input and output device 2d of the kiosk terminal 22. A photographing execution button for a personal image is displayed on the input and output device 2d of the kiosk terminal 22, and a face photo of the guest GS1 is taken using the camera 2c. The taken face photo is displayed on the input and output device 2d of the kiosk terminal 22. Upon receipt of an input through pressing of the photographing execution button by the guest GS1, an image that the camera 2c is capturing at the time is taken, and taken face photo information on the guest GS1 is generated.

Subsequently, the passport face photo information is checked with the taken face photo information on the guest GS1, thus performing identification (identification step ST23).

Specifically, similar to the identification step ST13, the kiosk terminal 22 attaches the passport face photo information and the taken face photo information, and issues a face authentication request to the workflow control server 3. The workflow control server 3 requests authentication from the face photo information check unit 1a on the basis of the requested face authentication request. The face photo information check unit 1a compares respective images indicated by the received passport face photo information and taken face photo information, and calculates and then returns the probability of being a same person. The kiosk terminal 22 receives the calculated probability via the workflow control server 3. When the calculated probability is equal to or higher than a preregistered threshold, the kiosk terminal 22 determines that the guest GS1 is successfully identified.

The passport character information, and customer detail information stored in the storage device 4a may be checked with each other. The check may be executed as auxiliary measures for identification. The kiosk terminal 22 attaches the passport character information, and issues a character authentication request to the workflow control server 3. The workflow control server 3 requests authentication from the character information check unit 1b on the basis of the requested character authentication request. The character information check unit 1b compares the received passport character information with the customer detail information on the guest GS1 stored in the storage device 4a, and determines and then returns whether these pieces of information indicate identical content or not. The kiosk terminal 22 receives the determined result via the workflow control server 3. When the calculated probability is equal to or higher than a preregistered threshold, the kiosk terminal 22 determines that the guest GS1 is successfully identified.

Subsequently, depending on the identification result, the charging information for the guest room is displayed, and adjustment information is confirmed (adjustment information confirmation step ST24).

Specifically, the kiosk terminal 22 uses the room number input by the guest GS1 or the name of the guest GS1 as a key, and requests the hotel server 4 to read the room information, via the workflow control server 3. The kiosk terminal 22 displays the charging information in the read room information together with a check-out approval button. The kiosk terminal 22 receives an input on the check-out approval button by the guest GS1, and writes, via the workflow control server 3, the check-out date and time, in the room information stored in the storage device 4a of the hotel server 4.

Subsequently, credit card information on the credit card C1 is read using the credit card reader 4b, and pays an accommodation fee and a charged fee (charge payment step ST25).

Specifically, the kiosk terminal 22 displays an adjustment button, and receives an input on the adjustment button by the guest GS1. The kiosk terminal 22 instructs the credit card reader 4b to read the credit card C1, via the workflow control server 3 and the hotel server 4. The credit card reader 4b reads the credit card C1, and transmits information on the credit card C1 to the hotel server 4. The hotel server 4 asks the financial institution to perform a credit check, via the payment management server 6 and the financial institution GW 11. When the credit check result has no problem, the hotel server 4 requests the financial institution to pay on the basis of the charging information via the financial institution GW 11. After the confirmation on the hotel side is separately completed, the deposit is adjusted according to a similar flow.

Lastly, a receipt is issued (receipt issuance step ST26).

Specifically, a receipt printing button for printing a receipt using the printer, and a receipt transmission button for transmitting receipt data to the email address of the guest GS1 are displayed on the kiosk terminal 22.

When the kiosk terminal 22 receives an input on the receipt printing button by the guest GS1, this terminal performs printing through the printer 2e.

When the kiosk terminal 22 receives an input on the receipt transmission button by the guest GS1, this terminal obtains the email address of the guest GS1 by reading the customer detail information stored in the storage device 4a of the hotel server 4. In such a case, the kiosk terminal 22 may obtain the email address of the guest GS1 by receiving the input by the guest GS1. The kiosk terminal 22 requests the email server 7 to transmit a receipt through email to the email address of the guest GS1 via the workflow control server 3.

As described above, the passport face photo information is checked with the face-photo-at-check-out-time information, thus verifying whether the guest GS1 having issued the application for a check-out to the kiosk terminal 22 and the person having reserved accommodation to the hotel reservation management system 5 are identical or not. Consequently, the guest GS1 can be identified at the time of check-out.

The reception system 100a according to this first example embodiment displays the charging information on the room that the guest GS1 has stayed, and issues the receipt. Accordingly, the guest GS1 is not required to input information on the room number and the like, can obtain the charging information on the room, and the receipt or the receipt data, reduce the wait time in comparison with the case of manual identification, and facilitate improvement in convenience of the user.

The reception system 100a according to this first example embodiment can prevent the check-out by another person, by identification at the check-out time.

The reception system 100a according to this first example embodiment further includes the character information check unit 1b. When the kiosk terminal 22 receives the input indicating the application for a check-out of the guest GS1, the character information check unit 1b checks the passport character information with the customer detail information on the guest GS1 stored in the storage device 4a. In the reception system 100a according to this first example embodiment, at the time of check-out, the passport character information, and the guest reservation information include at least one of the given name and surname, nationality, address, passport number, and birth date of the bearer of the passport. Accordingly, more information can be checked. Consequently, the identification can be achieved at higher accuracy.

Another Example Embodiment Etc

Note that in the example embodiment described above, the present invention is described as a hardware configuration. However, the present invention is not limited thereto. The present invention can achieve the process of each configuration element by causing a CPU (Central Processing Unit) to execute a computer program.

Figure 5:
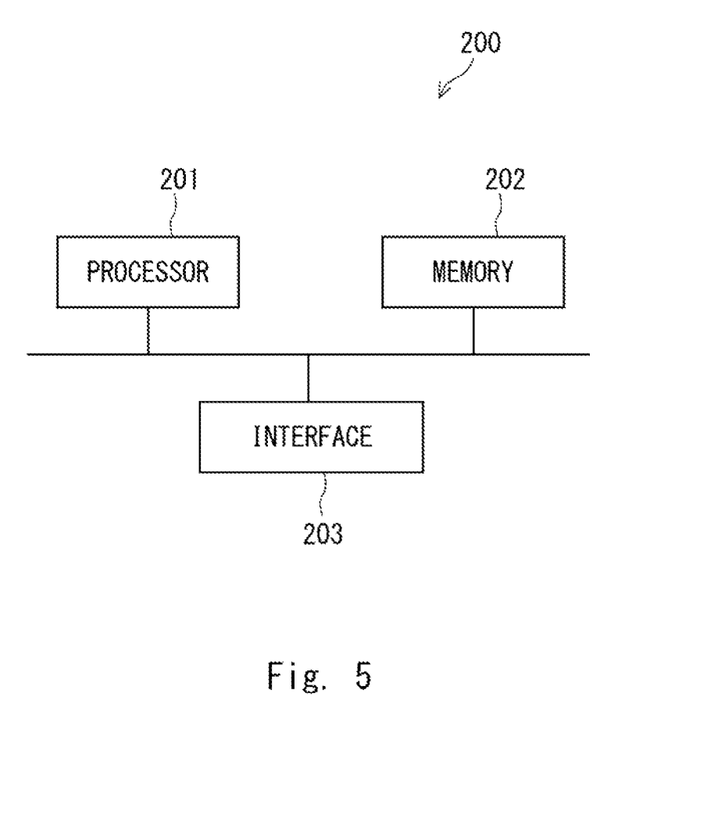
FIG. 5 shows one example of a hardware configuration included in the reception system.

For example, the reception system 100 according to the example embodiment described above may include a hardware configuration as described below. FIG. 5 shows one example of a hardware configuration included in the reception system.

An apparatus 200 shown in FIG. 5 includes a processor 201 and a memory 202 together with an interface 203. The reception system 100 described in the aforementioned example embodiment is achieved by the processor 201 reading and executing a program stored in the memory 202. That is, this program is a program for causing the processor 201 to function as the reception system 100 shown in FIG. 1 or a part thereof. This program can be regarded as a program for causing the reception system 100 shown in FIG. 1 to execute a process in the reception system 100 or a part thereof.

The program described above is stored using various types of non-transitory computer-readable media, and can be provided for a computer (the computer including an information notification device). The non-transitory computer-readable medium includes various types of tangible storage media. Examples of the non-transitory computer-readable media include magnetic recording media (e.g., a flexible disk, a magnetic tape, and a hard disk drive), and a magnetooptical recording medium (e.g., a magnetooptical disk). The examples further include a CD-ROM (Read Only Memory), CD-R, and CD-R/W. The examples further include semiconductor memories (e.g., a mask ROM, a PROM, an EPROM, a flash ROM, and a RAM). The program may be provided for the computer through various types of transitory computer-readable media. Examples of transitory computer readable media include an electric signal, an optical signal, and electromagnetic waves. The transitory computer readable media may supply the program to the computer via wired communication paths, such as an electric wire and an optical fiber, or a wireless communication path.

Furthermore, as with the description of the procedures of the processes in the reception system 100 in the aforementioned various example embodiments, the present invention may adopt an aspect as a processing method.

The invention of the present application has been described above with reference to the example embodiments. However, the invention of the present application is not limited to the above description. Various changes that those skilled in the art can understand are applicable to the configuration and details of the invention of the present application within the scope of the invention.

The present application claims the priority based on Japanese Patent Application No. 2019-231084 filed Dec. 23, 2019, the disclosure of which is incorporated herein by reference in its entirety.

Reference Signs List 100, 100a RECEPTION SYSTEM
1, 1a FACE PHOTO INFORMATION CHECK UNIT    1b CHARACTER INFORMATION CHECK UNIT
2 RECEPTION TERMINAL    22 KIOSK TERMINAL
2a CARD KEY WRITER    2b SCANNER
2c CAMERA    2d INPUT AND OUTPUT DEVICE
2e PRINTER
3 WORKFLOW CONTROL SERVER
4 HOTEL SERVER
4a STORAGE DEVICE    4b CREDIT CARD READER
5 HOTEL RESERVATION MANAGEMENT SYSTEM
5a STORAGE DEVICE
6 PAYMENT MANAGEMENT SERVER    7 EMAIL SERVER
8 CARD KEY MANAGEMENT SYSTEM    9 CARD KEY READER
10 NETWORK    11 FINANCIAL INSTITUTION GW 11
200 APPARATUS    201 PROCESSOR
202 MEMORY    203 INTERFACE
C1 CREDIT CARD    P1 PASSPORT
GS1 GUEST    K1 CARD KEY
ST11 CHECK-IN REQUEST STEP AND FACE PHOTO CAPTURE STEP    ST12 PASSPORT INFORMATION
ST13 IDENTIFICATION STEP CONFIRMATION STEP    ST14 RESERVATION DETAILS
ST15 DEPOSIT PAYMENT STEP    ST16 CARD KEY CREATION STEP
ST21 CHECK-OUT REQUEST STEP    ST22 PASSPORT INFORMATION AND FACE PHOTO CAPTURE STEP
ST23 IDENTIFICATION STEP CONFIRMATION STEP    ST24 ADJUSTMENT INFORMATION
ST25 CHARGE PAYMENT STEP    ST26 RECEIPT ISSUANCE STEP

What is claimed is:

1. A reception system comprising:
a face photo information check device comprising a first processor and first memory storing first instructions executable by the first processor;
a reception terminal; and
a character information check device comprising a second processor and second memory storing second instructions executable by the second processor, wherein
when the reception terminal receives input indicating an application for check-in of a guest, the face photo information check device checks passport-face-photo-at-check-in-time information scanned from a passport at time of check-in by a scanner, with face-photo-at-check-in-time information of the guest photographed at the time of check-in by a camera,
when the reception terminal receives the input indicating the application for the check-in of the guest, the character information check device obtains reservation information of the guest by using a reservation number specified by the input or a name of the guest specified by the input, and checks passport character information at the time of check-in scanned from the passport at the time of check-in by the scanner, with the obtained reservation information, and
when the passport-face-photo-at-check-in-time information and the face-photo-at-check-in-time information indicate a same person, and when the passport character information at the time of check-in and the obtained reservation information include same information of the guest, the reception terminal displays information on a room reserved by the guest, and issues a card key for the room reserved by the guest by causing a card key writer connected to the reception terminal to create the card key associated with the room reserved by the guest, the card key being a physical card key that is readable by a card key reader at the room reserved by the guest to permit entry into the room,
when the reception terminal receives input indicating an application for check-out of the guest, the face photo information check device checks passport-face-photo-at-check-out-time information scanned from the passport at time of check-out by the scanner, with face-photo-at-check-out-time information of the guest photographed at the time of check-out by the camera, and
when the passport-face-photo-at-check-out-time information and the face-photo-at-check-out-time information indicate a same person, the reception terminal executes a check-out process.

2. The reception system according to claim 1, wherein when the reception terminal receives the input indicating the application for the check-out of the guest, the character information check device checks passport character information at the time of check-out scanned from the passport at the time of check-out, with the reservation information of the guest.

3. The reception system according to claim 1, wherein the passport character information, and the reservation information of the guest include at least one of a given name and surname, a nationality, an address, a passport number, and a birth date of a bearer of the passport.

4. A computer-implemented reception method performed by a computer and comprising:
checking, upon receipt of input indicating an application for check-in of a guest, passport-face-photo-at-check-in-time information scanned from a passport at time of check-in by a scanner, with face-photo-at-check-in-time information of the guest photographed at the time of check-in by a camera;
when receiving the input indicating the application for the check-in of the guest, obtaining the reservation information of the guest by using a reservation number specified by the input or a name of the guest specified by the input, and checking passport character information at the time of check-in scanned from the passport at the time of check-in by the scanner, with the obtained reservation information;

displaying information on a room reserved by the guest, and issuing a card key for the room reserved by the guest, when the passport-face-photo-at-check-in-time information and the face-photo-at-check-in-time information indicate a same person, and when the passport character information at the time of check-in and the obtained reservation information include same information of the guest, by causing a card key writer connected to the reception terminal to create the card key associated with the room reserved by the guest, the card key being a physical card key that is readable by a card key reader at the room reserved by the guest to permit entry into the room;

when receiving input indicating an application for check-out of the guest, checking passport-face-photo-at-check-out-time information scanned from the passport at time of check-out by the scanner, with face-photo-at-check-out-time information of the guest photographed at the time of check-out by the camera; and when the passport-face-photo-at-check-out-time information and the face-photo-at-check-out-time information indicate a same person, executing a check-out process.

5. The computer-implemented reception method according to claim 4, wherein receiving the input indicating the application for the check-out of the guest, and checking passport character information at the time of check-out scanned from the passport at the time of check-out, with the reservation information of the guest.

6. A non-transitory computer-readable medium storing a program causing a computer operating in a reception system to execute:

checking, upon receipt of input indicating an application for check-in of a guest, passport-face-photo-at-check-in-time information scanned from a passport at time of check-in by a scanner, with face-photo-at-check-in-time information of the guest photographed at the time of check-in by a camera;

when receiving the input indicating the application for the check-in of the guest, obtaining the reservation information of the guest by using a reservation number specified by the input or a name of the guest specified by the input, and checking passport character information at the time of check-in scanned from the passport at the time of check-in by the scanner, with the obtained reservation information;

displaying information on a room reserved by the guest, and issuing a card key for the room reserved by the guest, when the passport-face-photo-at-check-in-time information and the face-photo-at-check-in-time information indicate a same person, and when the passport character information at the time of check-in and the obtained reservation information include same information of the guest, by causing a card key writer connected to the reception terminal to create the card key associated with the room reserved by the guest, the card key being a physical card key that is readable by a card key reader at the room reserved by the guest to permit entry into the room;

when receiving input indicating an application for check-out of the guest, checking passport-face-photo-at-check-out-time information scanned from the passport at time of check-out by the scanner, with face-photo-at-check-out-time information of the guest photographed at the time of check-out by the camera; and when the passport-face-photo-at-check-out-time information and the face-photo-at-check-out-time information indicate a same person, executing a check-out process.

\* \* \* \* \*